United States Patent

[11] 3,552,568

| [72] | Inventor | Charles E. Wade<br>Covina, Calif. |
|---|---|---|
| [21] | Appl. No. | 685,147 |
| [22] | Filed | Nov. 22, 1967 |
| [45] | Patented | Jan. 5, 1971 |
| [73] | Assignee | Purex Corporation Ltd.<br>Lakewood, Calif.<br>a corporation of California |

[54] POOL CHLORINATION
4 Claims, 3 Drawing Figs.

[52] U.S. Cl. ........................................ 210/169,
210/198
[51] Int. Cl. ........................................ E04h 3/20
[50] Field of Search ............................ 210/169,
60, 198; 222/81, 86

[56] References Cited
UNITED STATES PATENTS

| 2,623,014 | 12/1952 | Kloth ............... | 210/169X |
| 2,679,140 | 5/1954 | Burchett ........... | 222/81X |
| 2,984,939 | 5/1961 | Russell ............. | 222/81X |
| 3,351,542 | 11/1967 | Oldershaw et al. .. | 210/169X |

Primary Examiner—Reuben Friedman
Assistant Examiner—T. A. Granger
Attorney—White and Haefliger ABSTRACT: Pool chlorination is effected safely and swiftly by discharging pressurized $Cl_2$ into the pool water recirculation system from a pressure resistant container, suitably having a rupturable closure arranged for directionally controlled release of the $Cl_2$ contents.

PATENTED JAN 5 1971
3,552,568
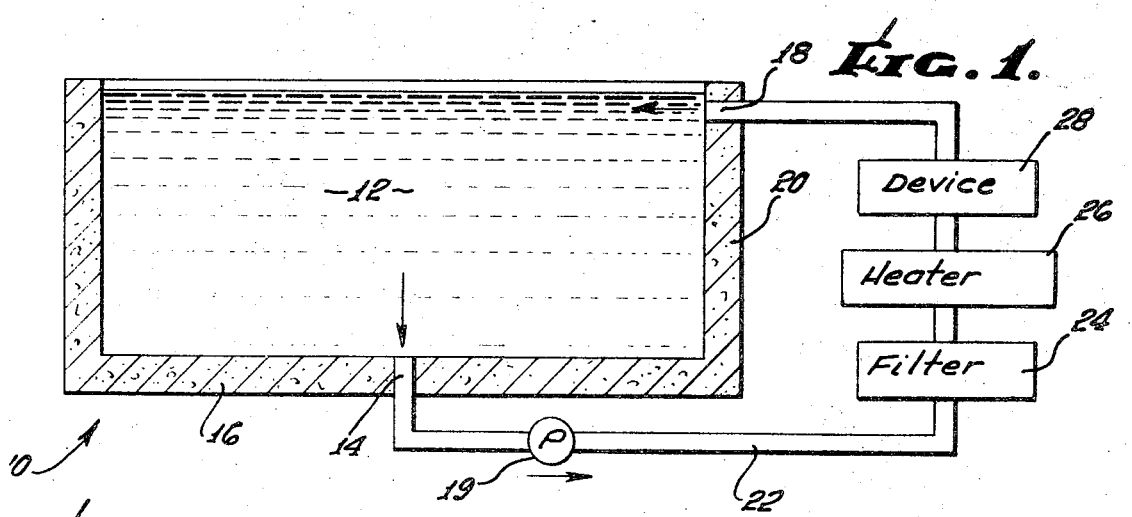
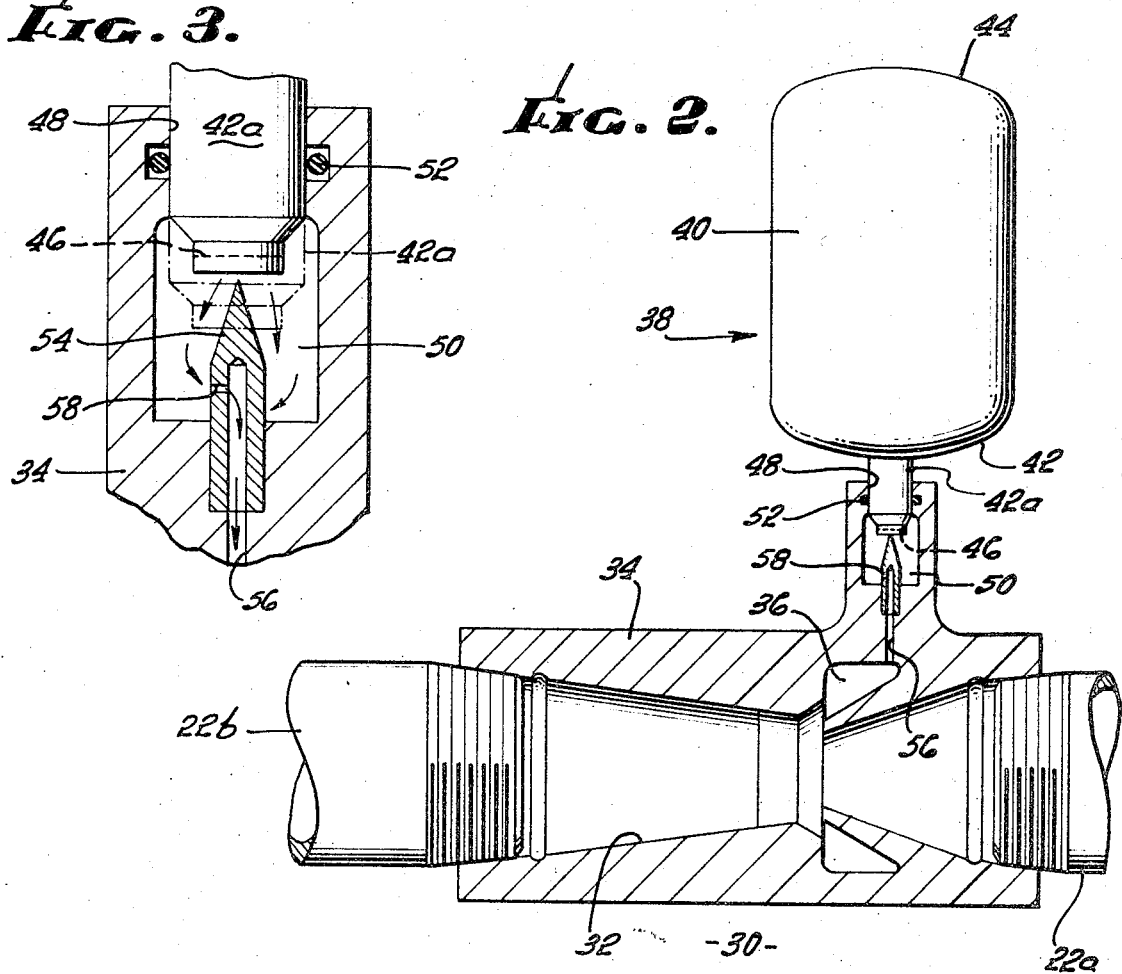
INVENTOR.
CHARLES E. WADE
BY White & Haefliger
ATTORNEYS.

3,552,568

POOL CHLORINATION

BACKGROUND OF THE INVENTION

1. Field of the Invention

This invention has to do with maintaining healthfulness of swimming pools and particularly is concerned with the expedient introduction of chlorine into pool water to maintain its healthfulness. In a particular aspect the invention is concerned with novel means for adding chlorine to swimming pool water.

2. Prior Art

Chlorine is maintained in all pools. Generally a solid or predissolved water soluble chlorine compound e.g. potassium chlorocyanurate or sodium hypochlorite is periodically added to the pool water to replenish the chlorine level therein. Addition of these products may entail walking about the pool with an emptying jug of highly corrosive fluid to avoid unsafe concentrations or be otherwise inconvenient.

Several attempts to generate chlorine in situ, electrolytically, have been proposed but none has met widespread success.

SUMMARY OF THE INVENTION

Chlorine is added directly to the pool water in the recirculation system for return into the pool. Swimming pools of any reasonable size are provided with filtering systems to purify the water continually. Thus pools have recirculation systems drawing water generally from the bottom of the pool to and through a filter device and back to the pool, usually near the surface at one end. The water may be heated during this circulation.

In the present invention gaseous $Cl_2$ is added to pool water, in the recirculation system, from a pressurized supply, conveniently just ahead of the pool inlet. All that is required is the opening of communication between a supply, such as a pressurized container and the recirculation system interior. Such addition is effected periodically according to pool requirements.

The invention also includes a pool chlorination apparatus for a pool having a water recirculation system including a container having $Cl_2$ under pressure and means for releasing the $Cl_2$ under pressure from the container into the water system. Typically the container will have a pressure responsive closure and the apparatus will include means for opening the closure for release of the $Cl_2$ into the water system. In certain embodiments the $Cl_2$ into the water system. In certain embodiments the $Cl_2$ releasing means may include suction means in communication with the container interior and means adjacent the valve for receiving the $Cl_2$ container. The valve if provided may be arranged to be responsive to pressure from the $Cl_2$ released from the container.

In preferred embodiments, the container is portable and disposable, being provided with a rupturable closure at one end for reception by the container-receiving means, which may be provided with means for piercing the closure to release the $Cl_2$ from the container.

There may be provided, therefore, apparatus useful for chlorinating swimming pools comprising a pressure resistant container having pressurized $Cl_2$ therein, which container has a rupturable wall section for directionally controlled release of the $Cl_2$.

BRIEF DESCRIPTION OF THE DRAWINGS

FIG. 1 is a somewhat schematic view of a pool having a water recirculation system with a device of the present invention added thereto;

FIG. 2 is a view generally in section of the apparatus of the invention; and

FIG. 3 is a detailed view of the apparatus shown in FIG. 2 illustrating the gas path.

DESCRIPTION OF THE PREFERRED EMBODIMENTS

Referring to FIG. 1 a pool 10 filled with water 12 has an outlet 14 in bottom 16 and an inlet 18 in end wall 20. The pool 10 has a water recirculation system including pump 19 connected in conduit 22 which extends from outlet 14 to inlet 18. Across and in communication with conduit 22 is a filter 24 of conventional construction e.g. U.S. Pat. No. 3,202,284 to Wade, a heater 26 also of conventional design e.g. U.S. Pat. No. 3,028,088 to Goehring and a device, generally indicated at 28, of the present invention.

The device 28 is shown in a specific embodiment in FIGS. 2 and 3. Referring to FIG. 2 conduit sections 22a and 22b are interconnected across a venturi construction 30 formed in bore 32 of mounting block 34. By virtue of the construction 30 a negative pressure or suction is developed at 36 when water flows through the bore 32 for purposes as will appear.

Pressurized chlorine gas is provided by container 38. Generally this container will be formed as shown with a cylindrical body 40 and domed top and bottom portions 42 and 44 respectively. The top 42 has formed therein a neck 42a having a metallic membranous closure 46 (dotted line) which is pressure resistant, like the container, sufficiently to contain the pressurized gas but which is responsive i.e. yieldable under superior pressure. In the embodiment shown the closure 46 is rupturable for purposes to appear. The neck 42a forms a discharge nozzle for directional release of the container contents.

Mounting block 34 is shaped to provide a container neck receiving means in the form of socket 48, a generally cylindrical vertical protuberance having formed therein a chamber 50 for receiving the neck 42a of the container 38. Seal 52, generally an O-ring, is provided along the outward aperture of chamber 50 to fluid tightly sealably receive the neck 42a.

Upstanding within the chamber 50 and centrally thereof is a puncture tip 54. The tip 54 is bored centrally and communicates through passage 56 with bore area 36 of the block 34. In addition a lateral port 58 is provided in the tip for establishing communication between chamber 50 and the bore area 36.

With reference to FIG. 3, the closure 46 having been pierced by puncture tip 54 by virtue of the container having been in the dotted position and subsequently withdrawn, the pressurized $Cl_2$ is released directionally downward into chamber 50. Pressure from the container forces the $Cl_2$ through the port 58 and into passage 56, and ultimately into area 36 of the bore 32. Movement of water from conduit section 22a to section 22b creates a reduced pressure in area 36 as explained. $Cl_2$ gas is thus drawn from passage 56 into the moving water stream for introduction in the pool water 12.

Materials of construction are not narrowly critical, due regard being had for the known corrosiveness of chlorine water mixtures. The block 34 suitably is molded plastic or an alloy casting. The puncture tip 54 is suitably stainless steel or titanium. The container 38 may be any material but typically will be steel or aluminum. Closure 46 may be a wall section of reduced thickness to facilitate tip penetration to release the gas from the container.

I claim:

1. Apparatus for chlorinating swimming pool water during recirculation thereof to and from the pool comprising chlorine delivery means responsive to recirculating flow of pool water, said means including a portable and disposable container having an openable closure and containing a pressurized $Cl_2$ gas supply, aspirating means comprising a body having a bore for water flow providing a venturi constriction, side inlet means to the bore and means mounting said container outwardly adjacent said side inlet means, and means operable to open said closure on bodily movement of the container to release $Cl_2$ gas from the container, said aspirating means communicating suction pressure to said $Cl_2$ gas supply through said side inlet means in response to pool water flow through said bore to draw $Cl_2$ gas from said supply into water flowing through said bore.

2. Apparatus according to claim 1 in which said closure comprises a container neck portion having a rupturable closure membrane and said container mounting means comprises a socket formed integrally with said body for receiving said container neck portion in sealing relation.

3. Apparatus according to claim 2 in which said closure-opening means comprises puncture means within said container-mounting socket arranged to puncture said container closure membrane, said puncture means having port means for passage of $Cl_2$ gas from the container to said side inlet means.

4. Apparatus according to claim 1 including also a conduit through which the pool water recirculates and a pump for recirculating the water in the conduit said chlorine delivery means being connected across said conduit on the output side of said pump.